Sept. 5, 1961 T. E. SPENCE ET AL 2,998,636
METHODS OF FABRICATING ANTI-FRICTION BEARINGS
Filed Oct. 16, 1958 4 Sheets-Sheet 1
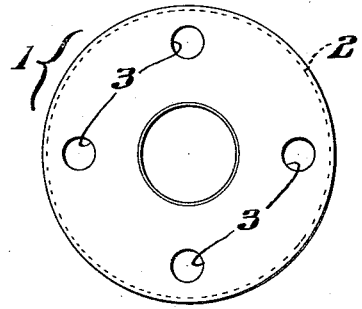
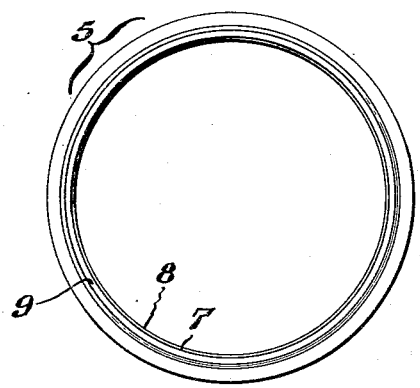
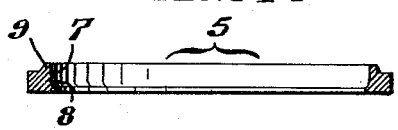
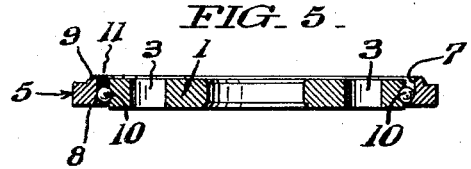
INVENTORS.
Thomas E. Spence &
Francis Russell Smith,
BY Paul & Paul
ATTORNEYS.

Sept. 5, 1961 T. E. SPENCE ET AL 2,998,636
METHODS OF FABRICATING ANTI-FRICTION BEARINGS
Filed Oct. 16, 1958 4 Sheets-Sheet 2

INVENTORS.
Thomas E. Spence &
Francis Russell Smith,
BY Paul & Paul
ATTORNEYS.

Sept. 5, 1961  T. E. SPENCE ET AL  2,998,636
METHODS OF FABRICATING ANTI-FRICTION BEARINGS
Filed Oct. 16, 1958  4 Sheets-Sheet 3
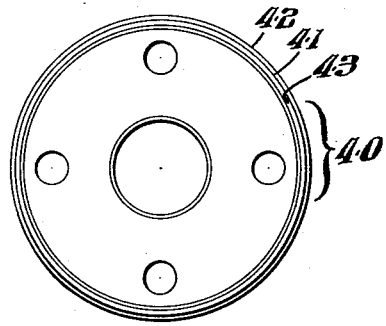
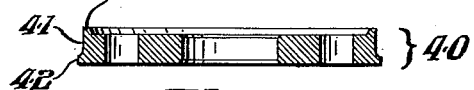
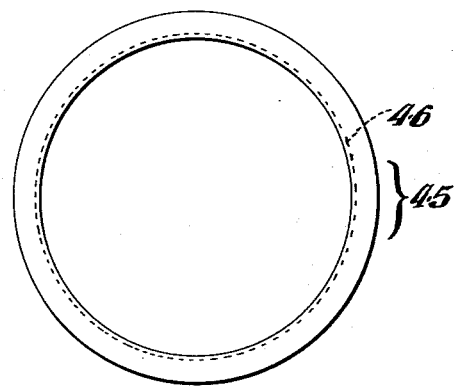
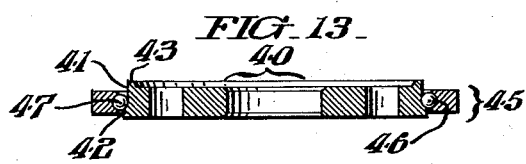
INVENTORS.
Thomas E. Spence &
Francis Russell Smith,
BY Paul & Paul
ATTORNEYS.

Sept. 5, 1961 T. E. SPENCE ET AL 2,998,636
METHODS OF FABRICATING ANTI-FRICTION BEARINGS
Filed Oct. 16, 1958 4 Sheets-Sheet 4

INVENTORS.
Thomas E. Spence &
Francis Russell Smith,
BY Paul & Paul
ATTORNEYS.

United States Patent Office 2,998,636
Patented Sept. 5, 1961

2,998,636
METHODS OF FABRICATING ANTI-FRICTION BEARINGS
Thomas E. Spence, Wayne, and Francis R. Smith, Philadelphia, Pa., assignors, by direct and mesne assignments, to SKF Industries, Inc., Philadelphia, Pa., a corporation of Delaware
Filed Oct. 16, 1958, Ser. No. 767,676
5 Claims. (Cl. 29—148.4)

This invention relates to methods of manufacturing anti-friction bearings of a type in which multiple rolling elements such as balls are engaged in the opposed external and internal grooves, respectively, of coaxial inner and outer race components, and more particularly to bearings which retain a full complement of rolling elements.

The chief aim of our invention is to provide a simple and reliable method by which bearings of the kind referred to can be produced in quantity with the grooves of the raceways smooth and conformative in cross section to the shape of the rolling elements, without undesirable interruption due to filling notches or split raceways such as usually employed heretofore to assemble a full complement of rolling elements.

How the foregoing and other objectives and important advantages are realized in practice will appear from the following detailed description of the attached drawings wherein:

FIG. 1 shows, in plan, the inner race component of an anti-friction bearing produced in accordance with our invention.

FIG. 2 shows the inner race component in axial section.

FIG. 3 is a plan view of the outer race component of the bearing as initially formed.

FIG. 4 shows the outer race component in axial section.

FIG. 5 is a view in axial section showing how the inner and outer race components and the rolling elements are assembled in preparation for the completion of the bearing in accordance with the invention.

FIGS. 9–15 are views respectively corresponding to FIGS. 1–7 showing an alternative procedure in the fabrication of an anti-friction bearing in accordance with our invention.

Figure 7:
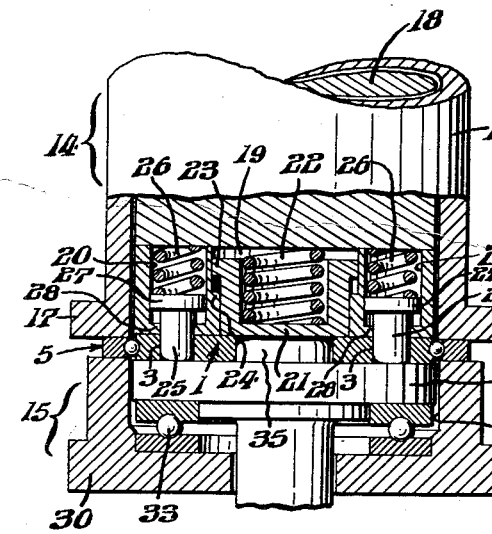
FIGS. 6 and 7 are views partly in elevation and partly in section of an apparatus which we have devised for carrying out the final step of finishing the bearing.

In accordance with one procedure we form, as exemplified in FIG. 1, an annular inner race component 1 having a peripheral groove 2 which is cross sectionally shaped to correspond with the configuration of the rolling elements (in this instance, balls) which are to be used in the bearing, and which is provided with a series of annularly-arranged holes 3; and a larger outer race component 5 whereof the inner surface of the opening extends straight downward part way as at 7 in parallel relation to the axis of the component and is continuous with the concaved surface of an inward circumferential flange projection 8 at the bottom which is to serve as one side wall of a groove for the rolling elements. The outer component 5 is also formed at the top with a narrow, shallow upward bead or ridge projection 9 which surrounds the straight portion 7 of the opening in said component. With the two components 1 and 5 thus prepared, we apply about the inner component with the aid of a suitable fixture, a full complement of rolling elements 10, and insert it and the applied rolling elements from above into the hollow of the outer component as shown in FIG. 5. Such assembling is made possible due to the provision of the wide annular interval 11 between the two components 1 and 5 by formation of the outer race components as above described.

Figure 6:
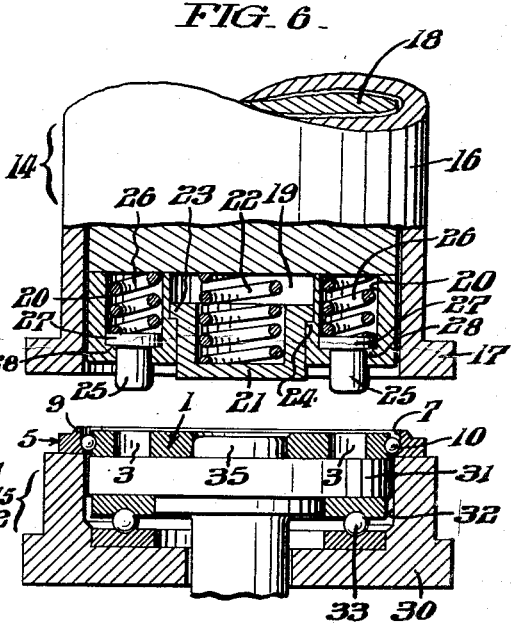
Figure 8:
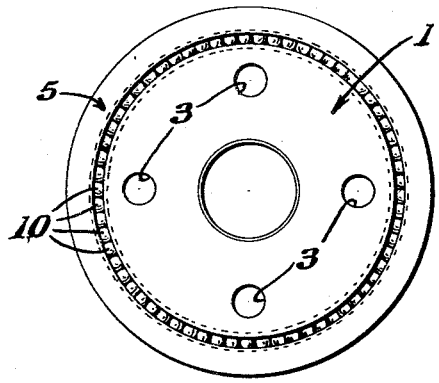
FIG. 8 shows the finished bearing in plan.

The final step in the fabrication of the bearing in accordance with our invention is to inwardly and downwardly displace the metal of the bead or ridge projection 9 of the outer race component 5 to close in upon the rolling elements 10, and to complete the groove for said elements, the finished bearing being shown in FIG. 8. This last step is accomplished with the apparatus illustrated in FIGS. 6 and 7 of the drawings. As shown, this apparatus comprises a press element 14 and a re-acting element 15. The press element 14 has a tubular body sleeve 16 with a flange 17 surrounding it at the bottom end. Rotatively engaged within the sleeve 16 of the press element 14 is a spinner shaft 18 having a central bore 19 and a series of annularly arranged bores 20 in its bottom, said bores 20 corresponding in number and in spacing with the holes 3 in the inner race component 1 of the bearing. Disposed within the axial bore 19 of the spinner shaft 18 is a hold-down plunger 21 which is urged downwardly by a spring 22 and of which the downward movement is restricted by engagement of the flange 23 thereon with an internal annular shoulder 24 of said bore. Each of the other bores 20 in the bottom end of the spinner shaft 18 is occupied by a pin 25 which is biased downwardly by a spring 26 and is limited in its downward movement by engagement of the head 27 thereof with an inward circumferential shoulder 28 at the bottom of the bore, the projecting end of the pin being of a diameter to fit into one of the holes 3 in the inner race component 1 of the bearing. The re-acting element 15 of the apparatus comprises a non-rotating member 30 which, as will be presently seen, serves as an anvil, and a disk-like platform 31 which is disposed within an axial recess 32 in said anvil. The platform 31 is supported for free rotation upon a frictionless thrust bearing 33 within the recess 32 of the anvil 30 and, as shown, has an upward axial projection 35 corresponding in diameter to the center opening in the inner race component 1 of the bearing. With the press and re-acting elements 14 and 15 separated as in FIG. 6, the bearing assemblage of FIG. 5 is placed in the apparatus and centered by impalement of the inner race component 1 over the upstanding axial projection 35 of the platform 31. It is to be noted that when the bearing assemblage is so placed in the apparatus, the inner race component 1 is firmly supported upon the platform 31 and the outer race component 5 on the annular top surface surrounding the recess 32 of the anvil 30. With the bearing assemblage now in position, the press and reacting elements 14 and 15 of the apparatus are gradually moved relatively, one toward the other, incident to which the pins of the reacting element eventually enter the holes 3 in the inner race component 1 which is thereby set into positive rotation by virtue of being connected to the spinner shaft 18 and held against the platform 31, while the outer race component 5 is held against rotation between the bottom of the sleeve 16 and the annular top surface of the anvil 30. As the press and re-acting elements of the apparatus continue in their movement toward each other, the metal of the upstanding ridge or bead 9 around the opening in the outer race component 5 of the bearing is gradually displaced downwardly and inwardly to close in upon the balls 10 and thereby complete the raceway of said outer race component, the bottom of the sleeve of the press element being eventually stopped against the top surface of the outer race component as shown in FIG. 7. Since the inner race component 1 is constantly rotated during operation of the apparatus, it will be seen that the groove surfaces of the two components of the bearing are rolled smooth by incidental rolling action of the balls.

Our method thus permits assembling of a full complement of rolling elements and involves a double cold forming action to close the groove of the outer race component for retainment of the rolling elements in rolling engagement between the races. The double cold rolling action consists in displacing a portion of the outer race component into the path of the rolling elements and simultaneously smoothly rolling out the displaced metal by the rolling action of the rolling elements. Moreover, through our method, deep grooves for the rolling elements are obtained by presentation of a controllable amount of metal for displacement. It further makes possible the attainment of highly finished raceway grooves by importation of the highly finished surface characteristics of the rolling elements to the groove surfaces.

Figure 14:
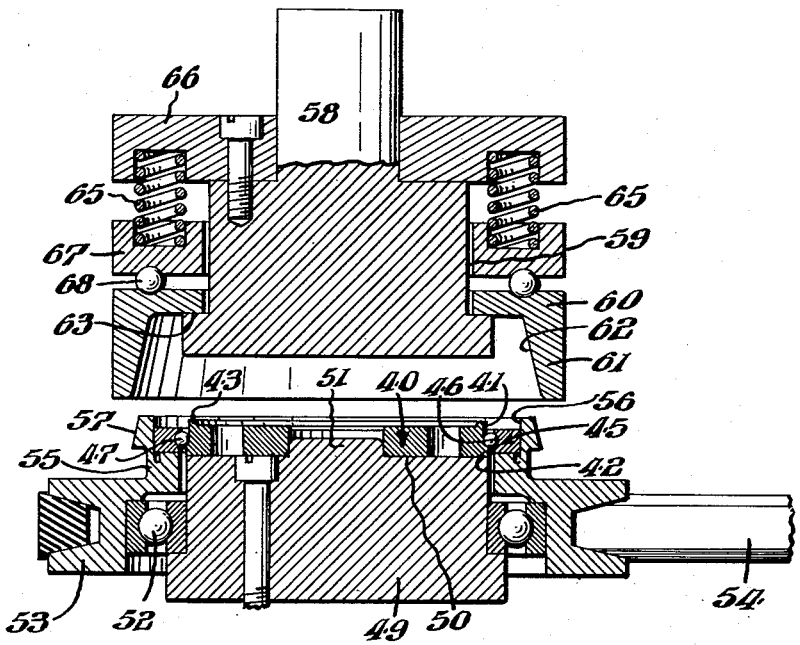
Figure 15:
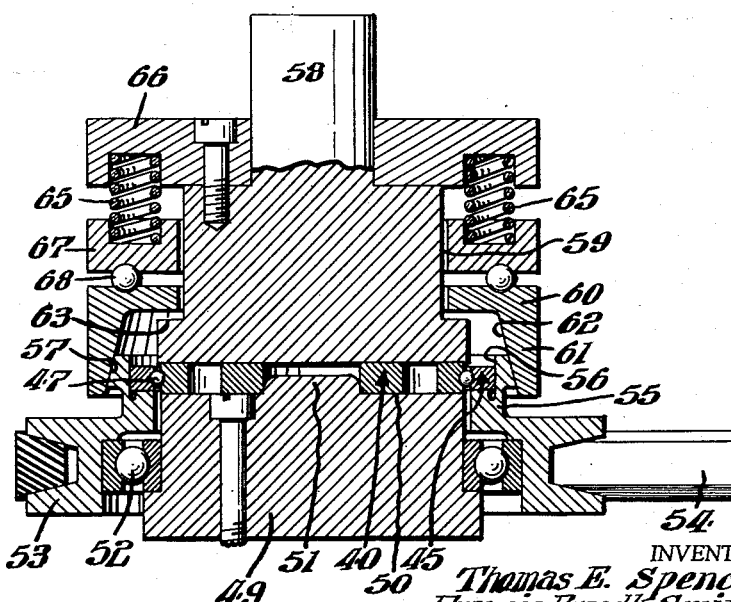

In the alternative procedure to produce an anti-friction bearing in accordance with our invention, we form, as shown in FIGS. 9 and 10, an inner race component 40 having a peripheral surface which extends straight downward part way, as at 41, in parallel relation to the axis of said component to an outwardly projecting circumferential flange 42 at the bottom to serve as one side wall of a groove for the rolling elements. The inner race component 40 is in this case also provided with a narrow shallow bead or ridge projection 43 which surrounds the straight portion 41 of the opening in said component. The outer race component 45, on the other hand, is in this instance formed, as shown in FIGS. 11 and 12, with an internal circumferential groove 46 which is cross sectionally shaped to conform with the configuration of the rolling elements. After inserting a full complement of rolling elements 47 into the groove 46 of the outer race component 45, this assemblage is applied over the inner race component as shown in FIG. 13 incident to which the balls come to rest upon the flange projection 42. For operation upon the assemblage of FIG. 13 to complete the bearing, we resort to the use of the apparatus illustrated in FIGS. 14 and 15. As shown, this apparatus comprises a rigidly supported cylindrical die block 49 having a circular top surface 50 corresponding to the area of the bottom face of the inner race component 40, and an upward axial boss 51 of a diameter corresponding to the diameter of the opening in said inner race component. Supported for rotation about the die block 49 by an anti-friction bearing 52, is a sheave 53 which is arranged to be driven by a V-belt 54 from a suitable power means not illustrated. As further shown, the sheave 53 has a relatively thin walled upwardly projecting hub 55 which is axially recessed as at 56 to snugly receive and to support the outer race component 45 of the bearing coplanarly with the inner race component 40, the peripheral surface of the hub being coned as at 57. For cooperation with the die 50 from above is a punch 58 of which the bottom surface is substantially equal in area to the top face of the die block 49; and surrounding the diametrically reduced portion 59 of the punch, with capacity for free rotation thereabout, is an annulus 60 having a pendent circumferential flange 61 of which the inner surface 62 is sloped to correspond with the taper 57 of the boss 55 of the sheave 53. Normally, when the punch 58 is elevated as in FIG. 14, the annulus 60 bears downwardly upon the shoulder at 63 against which it is yieldingly held, by the action of springs 65, in compression between a fixed abutment disk 66, and a collar 67 loosely surrounding the diametrically reduced portion 59 of the punch with interposition between it and the annulus 61 of balls 68. After the assembled parts of the bearing to be completed are placed in the apparatus as shown in FIG. 14, the punch 58 is lowered incident to which the annulus 60 first engages over the hub projection 55 (the springs 65 yielding to permit this) which by action of its sloped surface 62 with the tapered surface 57 of the hub, is caused to bind upon the outer race component 45 of the bearing for positive rotation with said sheave. As the punch 58 continues to descend, its bottom face is brought into contact with the bead or ridge 43 on the inner race component 40, said bead being thereby eventually displaced to close in upon the balls 47 as in FIG. 15. Thus here, as in the first described procedure, one component of the bearing is constantly rotated relative to the other component during completion of the bearing with the result that the grooves in both are rolled smoothly and evenly by the action of the balls.

While preferred embodiments of this invention have been described in some detail, it will be obvious to one skilled in the art that various modifications may be made without departing from the invention as hereinafter claimed.

Having thus described our invention, we claim:

1. A new method of fabricating a ball bearing comprising the steps of producing an inner race component with a fully formed peripheral groove cross sectionally rounded for engagement by the balls; producing a larger outer race component having a partial raceway with but one fully formed inwardly annular axial thrust shoulder at the bottom for the balls, and a circumferential bead projection surrounding the opening in the outer race component at the top at the side opposite the annular shoulder; applying a full complement of balls around the inner race component into the peripheral groove thereof; inserting the inner race component with the applied balls into the hollow of the outer race component until the balls rest upon the inwardly extending shoulder internally of the outer race component; and finally simultaneously rolling, bending and forging said circumferential bead projection radially to securely enclose and partially surround the balls, whereby a permanent bearing assembly having a full complement of rolling elements is produced.

2. A method of fabricating a ball bearing comprising the steps of producing an outer race component with a fully formed internal circumferential groove for engagement by the balls; producing a smaller inner race component having a partial raceway with a fully formed outward annular axial thrust shoulder for the balls to serve as one side of a groove for the balls, and an upwardly circumferential bead projection surrounding the opening in the inner race component at the side opposite the annular shoulder; applying a full complement of balls within the fully formed groove of the outer race component; placing the smaller inner race component within the outer race component to rest its annular shoulder upon the balls; and finally simultaneously rolling, bending and forging said circumferential bead projection radially to securely enclose and partially surround the rolling elements, whereby a permanent bearing assembly having a full complement of rolling elements is produced.

3. A method of fabricating an anti-friction bearing comprising the steps of producing an inner race component and an outer race component for eventual disposal between them of a complement of balls, providing one component with a fully formed radial entry ball groove for engagement with the balls and providing the other component with a partial groove, radially opposed to the groove in the other component, with but one fully formed axial thrust shoulder for the balls and a cylindrical surface leading from said partial groove to the side face of the component, ending in a projection adjacent to the cylindrical surface; applying a complement of balls within the fully formed groove of the one componentt and assembling the other component with the partially formed groove adjacent to the balls; and finally rotating one component and the balls relative to the other component while simultaneously radially displacing the projection against the rotating balls to complete the partial groove according to the ball form, whereby a permanent bearing assembly having a full complement of rolling elements is produced.

4. A method of fabricating a ball bearing, according to claim 3, wherein the full groove is formed on the inner race component, and the partial groove is formed on the outer race component.

5. A method of fabricating a ball bearing, according to claim 3, wherein the full groove is formed on the outer race component, and the partial groove is formed on the inner component.

References Cited in the file of this patent

UNITED STATES PATENTS

| | | |
|---|---|---|
| 1,080,169 | Reed | Dec. 2, 1913 |
| 2,629,165 | Stillwagon | Feb. 24, 1953 |
| 2,719,765 | Menne | Oct. 4, 1955 |
| 2,783,528 | Menne | Mar. 5, 1957 |
| 2,913,810 | Heim | Nov. 24, 1959 |

FOREIGN PATENTS

| | | |
|---|---|---|
| 617,991 | Great Britain | Feb. 15, 1949 |
| 502,554 | Belgium | Apr. 14, 1951 |
| 924,924 | Germany | Mar. 10, 1955 |